E. C. & A. B. CHASE.
FLYING MACHINE.
APPLICATION FILED JULY 5, 1911.
1,043,668.
Patented Nov. 5, 1912.
3 SHEETS—SHEET 1.
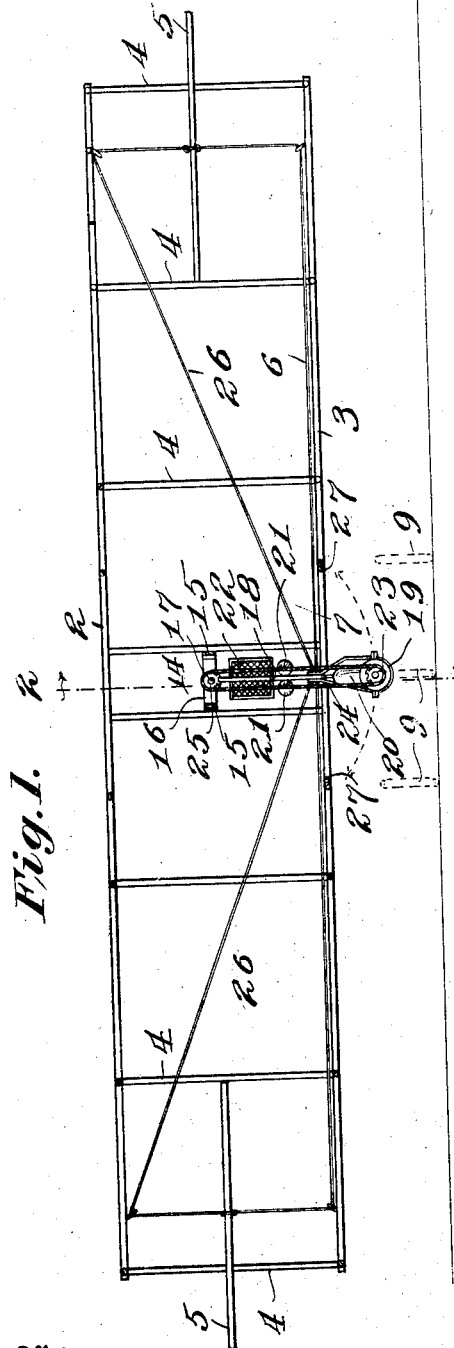
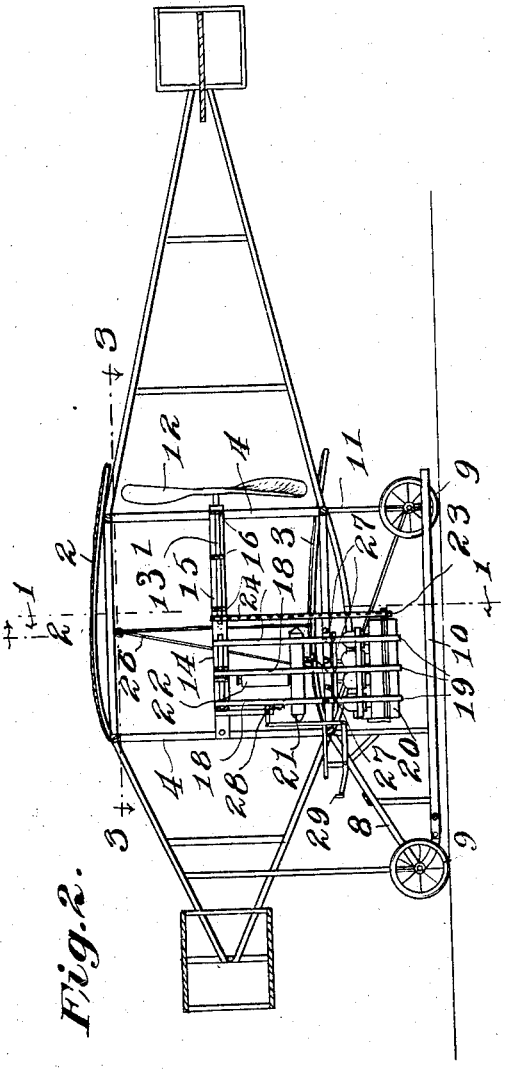
Witnesses
H. N. Lybrand
C. C. Hines
Inventors
Arthur B. Chase
Erwin C. Chase
By Victor J. Evans
Attorney

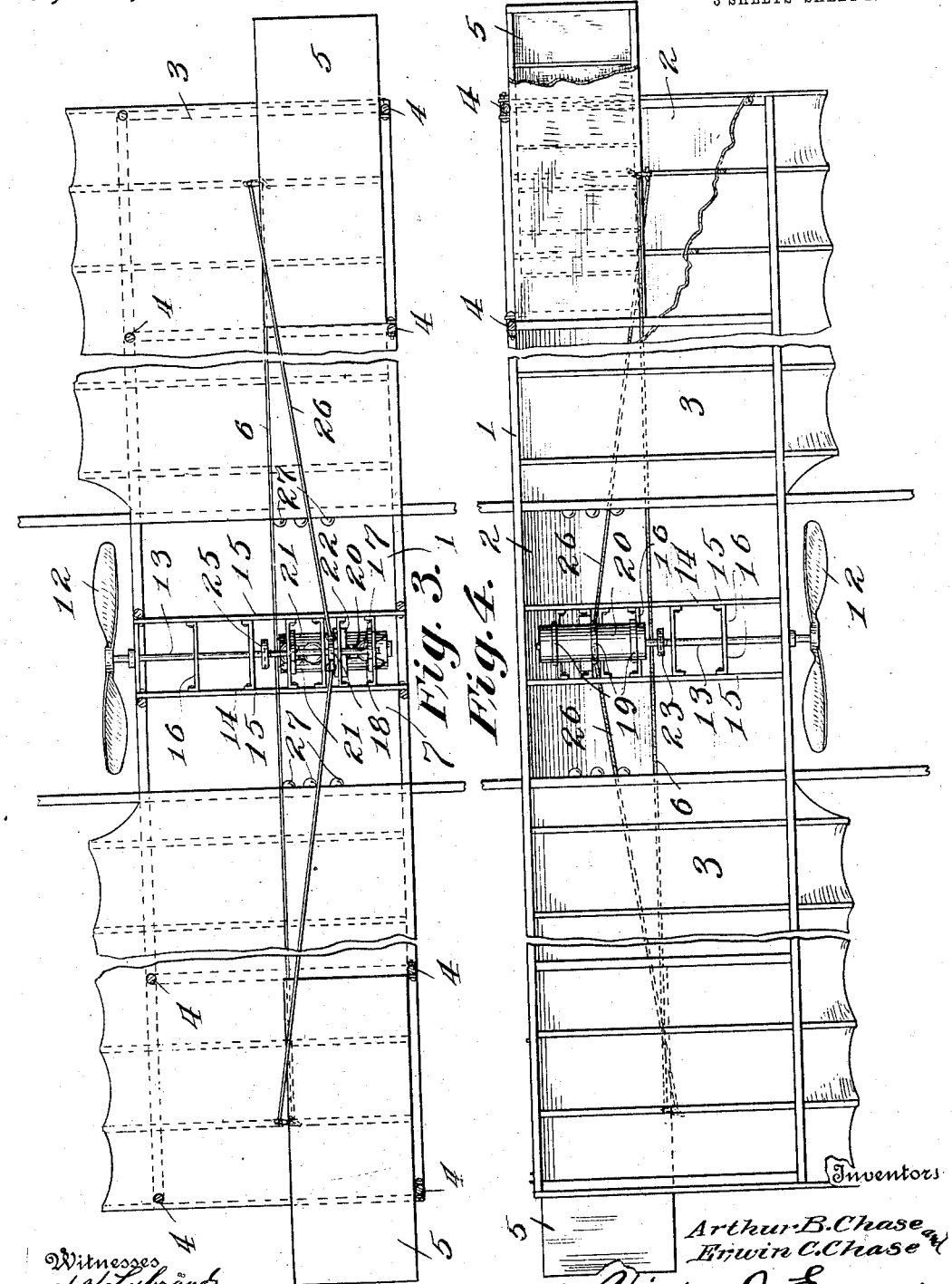

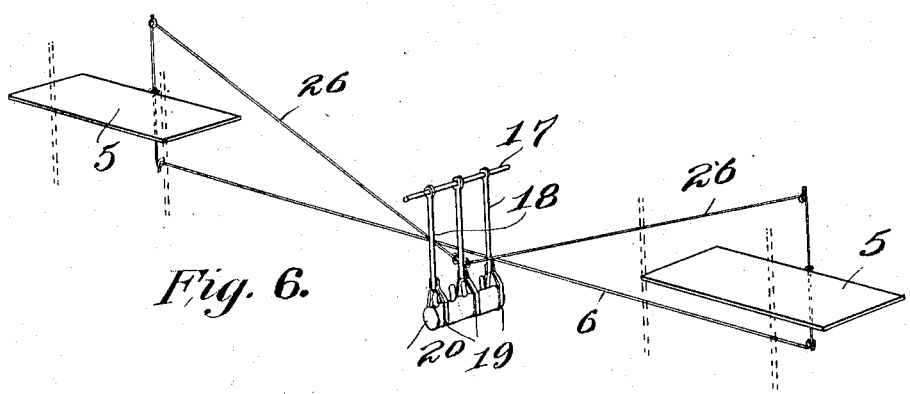
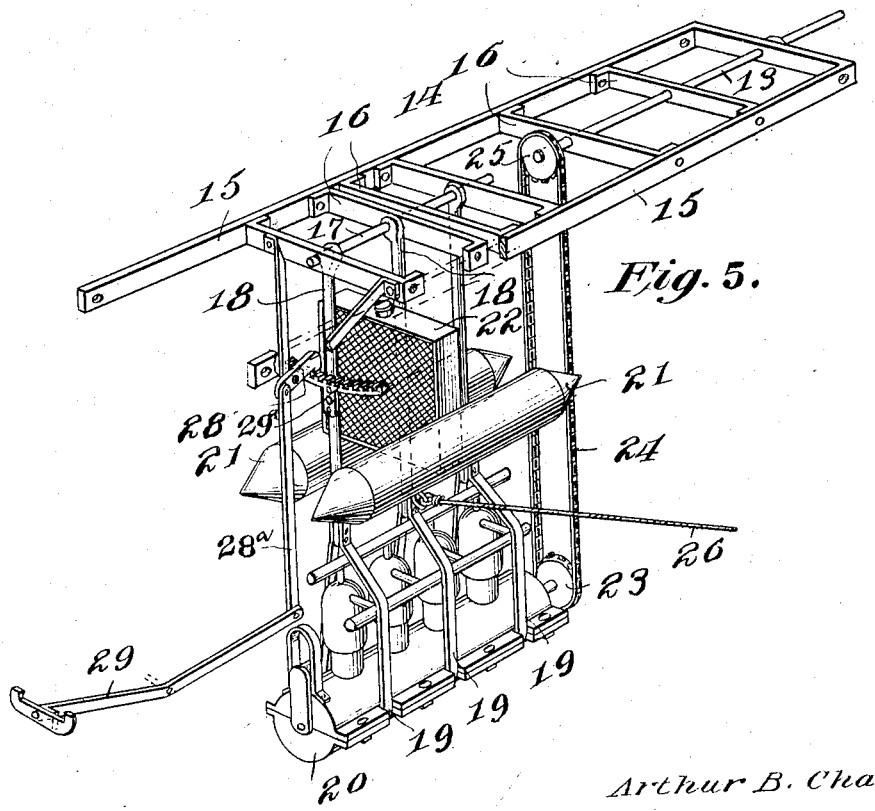

UNITED STATES PATENT OFFICE.

ERWIN C. CHASE AND ARTHUR B. CHASE, OF SEATTLE, WASHINGTON.

FLYING-MACHINE.

1,043,668.   Specification of Letters Patent.   Patented Nov. 5, 1912.

Application filed July 5, 1911. Serial No. 636,921.

*To all whom it may concern:*

Be it known that we, ERWIN C. CHASE and ARTHUR B. CHASE, citizens of the United States, residing at Seattle, in the county of King and State of Washington, have invented new and useful Improvements in Flying-Machines, of which the following is a specification.

This invention relates to aeroplane flying machines, and particularly to means for maintaining the lateral balance or poise thereof, the object of the invention being to provide means whereby the weight of the motor and associated parts may be employed to maintain a fixed center of gravity and the motor utilized as a weighted pendulum for operating balancing devices, whereby the normal lateral balance of the machine will be preserved and all undue lateral pitching or rocking prevented.

A further object of the invention is to provide means for limiting the oscillatory movement of the motor within reasonable and safe limits, for guarding the motor against possible injury in launching and landing, and for locking the motor against oscillatory movement when its use as a balancing element is not desired or required.

With these and other objects in view, the invention consists of the features of construction, combination and arrangement of parts, hereinafter fully described and claimed, reference being had to the accompanying drawings, in which:—
Figure 1 is a vertical transverse section on the line 1—1 of Fig. 2 of a flying machine embodying my invention. Fig. 2 is a longitudinal section on the line 2—2 of Fig. 1. Fig. 3 is a horizontal section on the line 3—3 of Fig. 2. Fig. 4 is a fragmentary bottom plan view, parts appearing in section. Fig. 5 is a perspective view of the engine carrying frame and parts mounted thereon. Fig. 6 is a diagrammatic view of the balancing mechanism.

In the present instance we have shown the application of our invention to a biplane machine, but it is not limited to machines of this particular type.

Referreing to the drawings, 1 designates the main frame, 2 and 3 the upper and lower planes, 4 the struts or stanchions connecting the planes, and 5 the balancing devices suitably mounted for adjustment to maintain the lateral equilibrium of the machine, which devices may be in the form of ailerons or wing tips as preferred. These balancing devices are connected for movement in unison by a cable 6 extending over suitable guide pulleys, whereby when one aileron or tip is tilted in one direction the other aileron or tip will be tilted in reverse direction. The lower plane 3 is provided with a central opening 7 below which is arranged a chassis 8 carrying the launching and landing wheels 9, said chassis including a skid or runner 10 reinforced by spaced braces 11.

The driving propeller 12 is preferably mounted at the rear of the machine upon a shaft 13 journaled in the rear portion of a frame structure 14 mounted centrally between the two supporting planes, said frame comprising longitudinal side bars 15 and connecting cross bars 16. Mounted upon the front portion of said frame in axial alinement with the propeller shaft 13 is a rod 17 forming a pivotal support for a series of depending hanger arms 18 which project downward through the openings 7 in the lower main plane and carry at their lower ends yokes 19 forming a sling or frame in which the driving motor 20 is mounted. As shown, the motor mainly occupies a position below the plane 3 and between the braces 11 and immediately above the skid or rudder 10, so that its weight will be disposed at a relatively low point to make the center of gravity of the machine correspondingly low, for a purpose readily understood. The fuel supply tanks 21 and radiator 22 are also preferably supported upon the rods 18 for support therefrom independent of the main frame and planes, and so that their weight will also be placed at a relatively low point to promote the stability of the machine. As a result of this construction and mode of mounting the parts, it will be seen that the motor is adapted to perform the function of a weighted pendulum, which maintains a vertical position irrespective of the lateral oscillating movements of the machine in flight, whereby the motor is adapted to be employed for controlling the ailerons or wing tips, as hereinafter described. The shaft of the motor carries a sprocket wheel 23 connected by a chain 24 with a sprocket wheel 25 on the propeller shaft 13, whereby motion is communicated to the propeller. It will be observed that by the arrangement of the propeller shaft in axial alinement with the pivot rod 17, the chain is adapted to swing in an arc as the center of motion coincides with the axis of the propeller shaft and fulcrum point on which the machine tilts, whereby a proper engagement of the chain with the sprocket gears is maintained and deflection of the chain from its normal course of travel prevented.

Cables 26 are connected with the ailerons or wing tips and lead therefrom to the swinging frame. These cables pass over guide pulleys on the main frame or upper main plane and are so arranged that when the machine tilts laterally in one direction one of the cables will be drawn upon to positively tilt one of the wing tips, while the other cable will be relaxed so that adjusting motion will be communicated to the other wing tip through the cable 6. When the machine tilts upward at one side, for instance, the wing tip at the opposite or low side will be swung down so that the air will bank against the lower face to force such side of the machine up, while the wing tip at the first-named or high side will be swung up through the connection 6 so that the air will bank against its upper face to force such side of the machine down, whereby the balance or equilibrium of the machine will be automatically restored. When either side of the machine tilts down, the aileron at that side will be similarly tilted down, and the aileron at the opposite side tilted up, with the result above noted. The motor is thus mounted to serve as an automatic controlling element, between which and the machine a relative motion is established when the machine tilts to control the cables in such manner as to properly adjust the ailerons to return the machine to a balanced position. The ailerons are disposed horizontally or edgewise when the machine is in balanced position, so that they normally set up no resistance to the travel of the machine.

It will be observed that the arrangement of the skid and motor is such that the skid is adapted to act as a guard or finger to prevent injury to the motor in the event that the machine lands with any unusual degree of force, and that the mode of suspending the motor enables any style of motor to be used. This style of mounting, in addition to the stabilizing action obtained, will permit engines of the rotating body type to be employed in such a manner as to secure a gyroscopic effect, giving added stability to the machine.

It will be understood that the arrangement of the engine below the aviator further prevents liability of injury to the aviator therefrom in the event of the falling of the machine to the ground. Stops or bumpers 27 are provided to limit the swinging movement of the pendulum, and a locking dog or device 28 connected by a link 28ª with a foot lever 29 is provided to engage a rack 29ª on the swinging frame and enable the aviator to lock the swinging frame and pendulum against motion, when desired.

It will, of course, be understood that any type of gearing for driving the propeller from the engine may be employed, and that any equivalent means for mounting the engine may be used. By disposing the engine below the supporting surface or surfaces in a monoplane or multiplane machine, the weight of the engine acting as a lever will effectually serve to prevent the machine from turning over laterally in either direction.

Having thus described the invention, we claim:—

1. In a flying machine, a main frame, a frame structure secured to the main frame and extending in a fore and aft direction, a longitudinally extending rod carried by said frame structure, a longitudinally extending propeller shaft carried by the frame structure and arranged in coaxial alinement with said rod, hangers pivotally supported by the rod for lateral movement, loops carried by said hangers and forming a sling, a motor supported by said sling, sprocket gears on the propeller and motor shafts, a chain connecting said gears, lateral balancing elements, connections between the said balancing elements and the swinging support formed by the hangers and sling, and means for locking and releasing said swinging support.

2. In a flying machine, the combination of a main frame carrying upper and lower supporting surfaces, the lower supporting surface having an opening therein, a longitudinally extending frame secured to the main frame between said supporting surfaces, lateral balancing elements, a rod carried by the longitudinal frame, a propeller shaft journaled on said longitudinally extending frame in axial alinement with the rod, hangers pivotally engaging the rod and extending downwardly through said opening in the lower supporting surface and carrying at their lower ends loops forming a sling, a motor mounted in said sling, sprocket gears on the motor and propeller shafts, a sprocket chain connecting said gears, stops at or adjacent the sides of the opening for limiting the swinging motion of the motor support, connections between said motor support and the balancing elements, and means for locking said motor support to the frame or releasing it to permit it to swing.

3. In a flying machine, a main frame, a fore and aft frame mounted upon the main frame, a propeller shaft carried by the fore and aft frame, a swinging frame pendent from said fore and aft frame and mounted to swing on an axis longitudinally alined with the propeller shaft, a motor mounted on the swinging frame, sprocket gearing between the propeller shaft and motor shaft, a locking member carried by the swinging frame, a support pendent from the fore and aft frame, a coacting locking device carried by said support, and controlling means for throwing said coacting locking device into and out of action.

In testimony whereof we affix our signatures in presence of two witnesses.

ERWIN C. CHASE.
ARTHUR B. CHASE.

Witnesses:
P. C. MILLS,
WESLEY J. WALKER.

Copies of this patent may be obtained for five cents each, by addressing the "Commissioner of Patents, Washington, D. C."